United States Patent [19]

Matsushita et al.

[11] Patent Number: 4,878,082

[45] Date of Patent: Oct. 31, 1989

[54] AUTOMATIC IMAGE DENSITY CONTROL APPARATUS

[75] Inventors: Kouji Matsushita; Keigo Tange; Shizuo Yuge, all of Osaka, Japan

[73] Assignee: Minolta Camera Kabushiki Kaisha, Osaka, Japan

[21] Appl. No.: 166,209

[22] Filed: Mar. 10, 1988

[30] Foreign Application Priority Data

Mar. 12, 1987 [JP] Japan ................................ 62-57476

[51] Int. Cl.[4] ................................ G03B 15/00

[52] U.S. Cl. ................................ 355/208; 355/214; 355/246

[58] Field of Search ............ 355/14 E, 14 D, 14 CH, 355/14 R, 27, 3 DD

[56] References Cited

U.S. PATENT DOCUMENTS 4,313,671 2/1982 Kuru ................................ 355/14 D
4,571,068 2/1986 Tarumi et al. ..................... 355/14 D
4,572,654 2/1986 Murai et al. ...................... 355/14 D

FOREIGN PATENT DOCUMENTS 59-81665 5/1984 Japan ................................ 355/14 D

*Primary Examiner*—L. T. Hix
*Assistant Examiner*—D. Rutledge
*Attorney, Agent, or Firm*—Price, Gess & Ubell

[57] ABSTRACT

An automatic image density control apparatus, wherein an original placed on a document table and a reference image pattern provided on one edge of the document table and having a image portion or half-tone portion and a non-image portion are scanned, and by way of an exposure, their electrostatic latent images are formed on a photosensitive member on which the non-developing portion with no developer is also formed, and by means of a density sensor for detecting the image density, the initial image density of the non-developing portion and the image density which varies as the time elapses are detected and by the ratio of them, the image density of the image portion or half-tone portion and the non-image portion of the reference image pattern are corrected, and according to the respective preset reference values of the image portion or half-tone portion and non-image portion and their corrected image density, the image portion or half-tone portion density and the non-image portion density of an image are uniformly controlled.

39 Claims, 7 Drawing Sheets

AUTOMATIC IMAGE DENSITY CONTROL APPARATUS

BACKGROUND OF THE INVENTION

1. Field of Invention

The present invention relates to an automatic image density control apparatus which makes an image density constant. More specifically, it relates to an automatic image density control apparatus which includes means for correcting errors caused by stains on a density sensor, deterioration of the surface of a photosensitive member or by fogging of a non-image portion.

2. Description of the Prior Art

In the past, as an image density control apparatus in a copying machine, for example, a toner image of a reference pattern image is formed on the outside of image region of a photosensitive member, a density of the toner image is detected optically with a density sensor, and on the basis of the detected result the amount of toner is controlled to make the image density constant. In such an image density control apparatus, however, the output of the density sensor is relatively deteriorated as a result of staining of the sensor, thus the density actually being lower, but the detected portion is regarded to be of high density, which results in an insufficient toner supply and eventually in an improper image density. In the invention disclosed in Japanese Patent Application Laid Open No. 81665/1984 for solving such problem as aforementioned, the non-image (erasing portion) density of the photosensitive member is detected and compared with the initial non-image density value for calculation, which is multiplied by the detected value of the toner image density to control the toner density on the basis of its calculated results.

However, in the invention of the aforementioned, reference since the ratio of the initial non-image (erasing portion) detected value with the detected value which varies as the time elapses, is taken as the result of stains of the density sensor to control the image density, if a small quantity of toner is stuck to the non-image portion (erasing portion), that is, a so-called "back ground fog" is produced and if the reflecting power is lowered due to the deterioration of the surface of the photosensitive member, which is misconceived as the stains of density sensor, it results in inaccurate detection of the image density.

SUMMARY OF THE INVENTION

The present invention is directed to solve the problems of the prior art aforementioned, therefore, its primary object is, by disposing means for forming the non-developing portion on a photosensitive member to which a toner is not stuck, to provide an automatic image density control apparatus which is capable of detecting the accurate image density and obtaining a constant image density on the basis of the detected result, without being affected by stains of the sensor and production of fog on the photosensitive member or the like which vary as the time elapses.

It is another object of the present invention to provide an automatic image density control apparatus which is capable of respectively controlling the image portion density and the non-image portion density, by respectively providing a image portion density correcting means and a non-image portion density correcting means.

The above and further objects and features of the present invention will more fully be apparent from the following detailed description with accompanying drawings.

DETAILED DESCRIPTION OF THE PREFERRED EMBODIMENT

Figure 1:
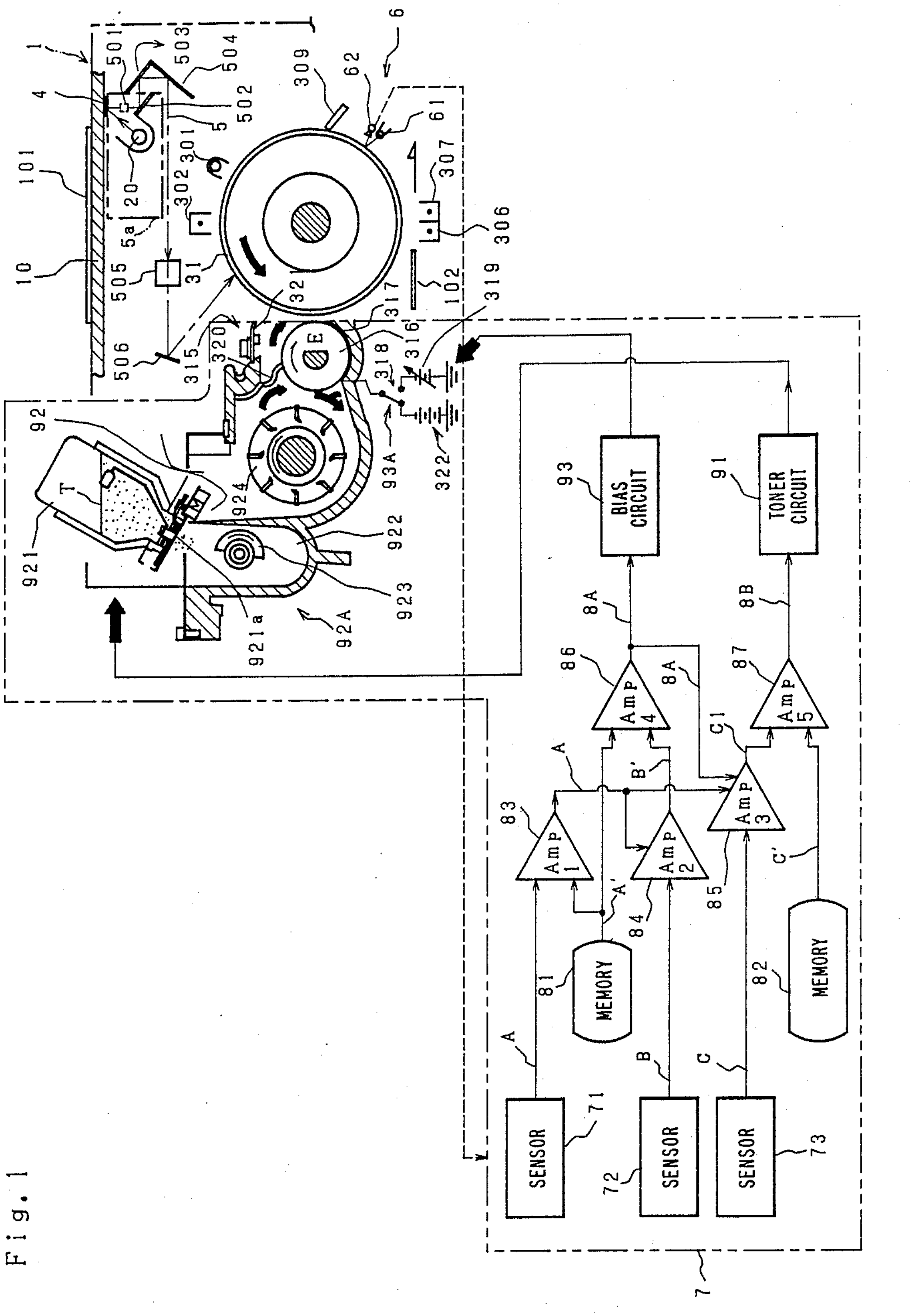
FIG. 1 is a block diagram showing the construction of the first embodiment of the present invention.
Figure 2:
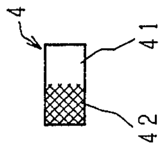
FIG. 2 and FIG. 3 are views showing reference patterns.
Figure 3:
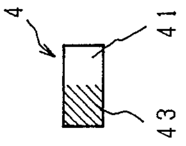

A copying machine including an automatic image density control apparatus according to the present invention will be particularly described as follows in conjunction with the accompanying drawings showing the embodiments. FIG. 1 is a block diagram showing the construction of the first embodiment of the present invention, in which a documents table 10 carrying an original 101 is provided on the upper portion of a housing 1 of the copying machine. FIGS. 2 and 3 are plan views schematically showing a reference image pattern. At one edge on the reverse side of the original 101 on the documents table 10, the reference image pattern 4 having a non-image portion 41 and a image portion 42 (FIG. 2) or the non-image portion 41 and a half-tone portion 43 (FIG. 3) is disposed.

Under the document table 10, a light source 20 for irradiating the original 101 and reference image pattern 4 is arranged on a movable member 5a together with a slit 501, which passes the reflected light irradiated and a first mirror 502 which reflects the light from the slit 501 horizontally. The movable member 5a is movable parallel to the document table 10 by way of a driving means (not shown), and against the first mirror 502, a second mirror 503 for vertically reflecting the light from the first mirror, and a third mirror 504 for horizontally reflecting the light from the second mirror are mounted movably horizontally. At a position suitably spaced horizontally from the third mirror 504, there is provided a lens 505 for developing an image on a photosensitive member 31 to be described later, and on the opposite side of the third mirror 504, a fourth mirror 506 is disposed to reflect the light from the lens 505 on the photosensitive member 31.

The light source 20, slit 501, first mirror 502, second mirror 503, third mirror 504, lens 505 and fourth mirror 506 constitute an exposing means 2.

Under the exposing means 2, the photosensitive member 31 coated organic photoconductive material on the surface thereof or the photosensitive member 31 is vaporized with a photoconductive material such as selenium on its surface. The member 31 is disposed rotatably by way of a driving means (not shown) in the housing 1. Likewise, around the photosensitive member 31, there are arranged a charger 302 as a means for charging the surface of the photosensitive member 31 at a predetermined charge (in a negative potential in this embodiment), an eraser lamp 301 for erasing the charged potential of the surface of the photosensitive member, a cleaning blade 309 for removing the positively charged toner as a developer remaining after copying, a density sensor 6 for detecting the image density of the photosensitive member 31, a transferring charger 306 for transferring the toner T which sticks to the surface of the photosensitive member onto the copying paper 102 and a separating charger 307 for separating the photosensitive member 31 and the copying paper 102.

Figure 4:
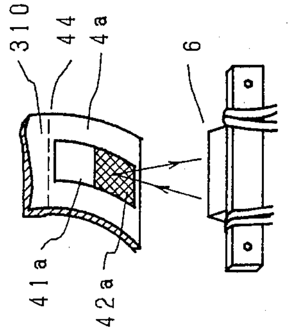
FIG. 4 and FIG. 5, corresponding to FIG. 2 and FIG. 3, are partly perspective views showing reference patterns and non-developing portions formed on a photosensitive member.
Figure 5:
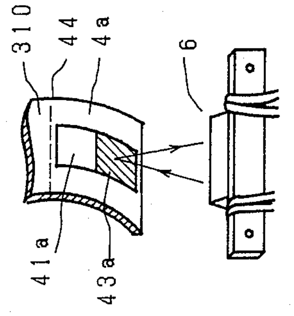

FIG. 4 and 5 are partly perspective views showing positions of the reference image and the non-developing portion to be described on the photosensitive member.

The density sensor 6 comprises a luminous element 61 for irradiating the light to the surface of the photosensitive member 31, and a light receiving element 62 for detecting the reflected light from the photosensitive member 31 and outputting a voltage corresponding to the reflected amount of light. The reflected amount of light from the light receiving element 62 is measured at a predetermined timing to respectively detect the output voltage showing the image density of the image portion which consists of a black portion 42*a* or halftone portion 43*a* and the non-image portion which consists of a white portion 41*a* of the reference image 4*a* formed by exposing and developing the non-developing portion 310 to be described later, as reference image patterns 4 on the surface of the photosensitive member 31.

Meanwhile, a toner bottle 921 storing the toner T is mounted on a toner feeder 92A with its opening 921*a* being directed obliquely downward, and a toner feed motor M for restricting the opening area is installed in the vicinity of the opening 921*a*. Likewise, underneath the opening 921*a*, a screw conveyer 923 for conveying the toner T is disposed, and a bucket roller 924 for mixing and stirring the toner T and a negatively charged carrier, which form two components of the developer, is provided thereunder.

The toner bottle 921, toner feed motor M, screw conveyer 923 and bucket roller 924 constitute the toner feeder 92A.

On the side of the bucket roller 924, a sleeve roller 317 incorporating therein a magnetic roller 316 is mounted adjoining the photosensitive member 31, and serves to convey the developer toward the photosensitive member 31 by way of the magnetic roller 316 incorporated therein, and to develop the unexposed portion of the photosensitive member. In the periphery of the sleeve roller 317, a doctor blade 320 for restricting the developer on the sleeve roller 317 at a fixed amount, and an anti-scattering blade 321 for preventing scattering of the toner T sucked onto the photosensitive member from the sleeve roller 317 are disposed.

Also, to the sleeve roller 317, a variable bias power source 319 and a fixed bias power source 322 are connected switchably through a change-over switch 318 which may be changed over to the fixed bias power source 322 side to form the non-developing portion 310 on the photosensitive member 31 to which the toner is not stuck at all. Likewise, the negative potential of the fixed bias power source 322 as a non-developing portion forming means 93A, is intensified so as to prevent the carrier from sticking onto the non-charged part (0-potential or remaining potential level) of the photosensitive member 31.

The toner feeder 92A, sleeve roller 317, magnet roller 316, doctor blade 320 and anti-scattering blade 321 constitute a developing means 92.

Meanwhile, an outlet line (not shown) of the density sensor 6 is connected through an A/D converter to a non-developing portion density sensor 71 as a first density detecting means, a image portion density sensor 73 and a non-image portion density sensor 72 as a second density detecting means. The non-developing portion density sensor 71, image portion density sensor 73 and non-image portion density sensor 72 extract and store the A/D conversion value of the output voltage of the density sensor 6 at a predetermined timing, which is outputted at a predetermined timing. Likewise, the non-developing portion density sensor 71 is connected to one end of a first amplifier 83 and to the other end thereof, the outlet line from a non-developing portion reference value memory 81 storing the reference density at the initial stage of the non-developing portion is connected. The outlet line of the non-developing portion reference value memory is also connected to one end of a fourth amplifier 86.

The first amplifier 83 is an output generating means which outputs a sensor correcting value A″ (A″=A′/A) which is a ratio between a non-developing portion output voltage A which varies as the time elapses, and a non-developing portion reference value A″ of the non-developing portion 310. The outlet line of the non-image portion density sensor 72 is connected to a second amplifier 84 which in turn outputs a non-image portion correcting value B′ ($B'=A'\times B$) obtained by multiplying the sensor correcting value A″ as an output value of the first amplifier 83, and a non-image portion output voltage B as an output of the non-image portion density sensor. The outlet line of the second amplifier 84 as a correcting means is connected to the other end of the forth amplifier 86 which in turn outputs a non-image portion control value 8A ($8A=A'-B'$) which is a difference between the non-developing portion reference value A′ and the non-image portion correcting value B′.

The outlet line of the image portion or half-tone density sensor 73 is connected to a third amplifier 85 whose outlet line is connected to one end of a fifth amplifier 87. To the other end of the fifth amplifier 87, the outlet line from a image portion reference value memory 82 which outputs a image portion reference value C′ is connected.

The outlet line from the fourth amplifier 86 is connected to a developing bias variable circuit 93 and the third amplifier 85, and the output from the fifth amplifier 87 is connected to a toner feed circuit 91. The third amplifier 85 as the correcting means performs the calculation to be described later and outputs a image portion control value 8B ($8B=C1-C'$) which is a difference between a image portion correcting value C1 as its output value and the image portion reference valve C'.

The fourth amplifier 86, fifth amplifier 87, developing bias variable circuit 93 and toner feed circuit 91 constitute a density control means.

The outlet line from the developing bias variable circuit 93 is connected to the variable bias power source 319 to control the non-image portion density. Likewise, the outlet line from the toner feed circuit 91 is connected to the toner feed motor M.

Operation of the automatic image density control apparatus of the first embodiment constructed as aforementioned will be described.

Prior to the copying process, in the state where the density sensor 6 is clean at a time immediately after delivery or after the cleaning by a servicing person, the non-developing portion 310 is formed on the surface of the photosensitive member 31, and its reflected amount of light detected by the density sensor 6 and converted into the non-developing portion reference value A' through the A/D converter is stored in the non-developing portion reference value memory 81. Then, the reference image pattern 4 is exposed on the surface of the photosensitive member 31, and the reflected amount of light of the image portion 42a or half-tone portion 43a detected by the density sensor 6 and converted into the image portion reference value C' through the A/D converter is stored in the image portion reference value memory 82.

For storing the non-developing portion reference value A', clarity of the luminous element 61 and the light receiving element 62 of the density sensor 6 must be checked and if stained they should be cleaned, then with care not to stick the toner onto the photosensitive member 31, the eraser lamp 301 is turned on and the change-over switch 318 is changed over to the fixed bias source 322 side to apply a predetermined negative potential to the sleeve roller 317. When the photosensitive member 31 is rotated in this state, an electrostatic latent image is not formed thereon and the toner T is only stuck to the sleeve roller 317 but not to the photosensitive member 31. Thereby, the non-developing portion 310 is formed on the surface of the photosensitive member 31, and its reflected amount of light is detected by the density sensor 6 so as to be stored in the non-developing portion reference value memory 81 through the A/D converter.

Figure 6:
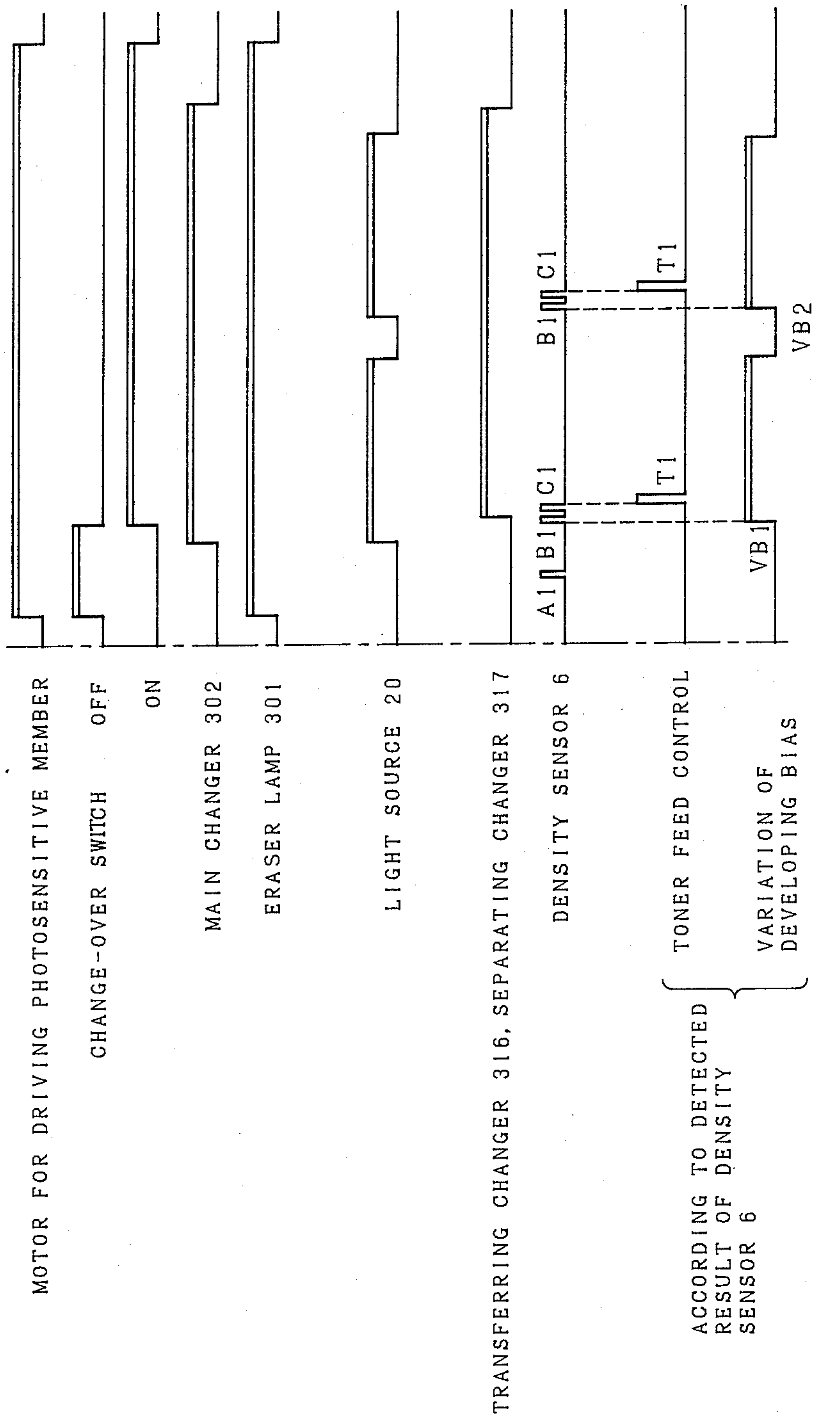
FIG. 6 is a schematic view showing a timing chart of the first embodiment.

FIG. 6 is a timing chart of the copying process of the first embodiment wherein two copies are taken. When the initial setting is completed by storing the non-developing portion reference value A' and the image portion reference value C', an operator places the original 101 on the document table 10 and turns on a copying switch (not shown). When the copying switch is turned on, a motor (not shown) for driving the photosensitive member 31 is rotated and the change-over switch 318 is changed over to the fixed bias power source 322 side and the eraser lump 301 is lit. Thereby, the non-developing portion 310 is formed partly on the photosensitive member 31. The non-developing portion 310 is represented by an A/D converted value of the output voltage of the density sensor 6, at the time it faces the density sensor 6, and the output is applied to the non-developing portion density sensor as the non-developing portion output voltage A. After the elapse of a predetermined time, period a main charger 302 and the light source 20 are turned on to scan the original 101 and begin to copy the first sheet. Immediately thereafter, the change-over switch 318 is changed over to the variable bias side and the transferring charger 316 and the separating charger 317 are turned on. Thereby, the toner T conveyed to the sleeve roller 317 from the toner bottle 921 through the screw conveyer 923 and bucket roller 924, is applied onto the unexposed portion on the surface of the photosensitive member 31 to form the reference image 4a and an original image. At this time, at each timing of the non-image portion 41a and the image portion 42a or half-tone portion 43a of the reference image 4a facing the density sensor 6, the A/D converted value of the density sensor output is taken into the non-image portion density sensor 72 and the image portion or half-tone portion density sensor 73 as the non-image portion output voltage B and the image portion output voltage C. As soon as the non-image portion output voltage B is taken in, if necessary, the developing bias is controlled with the developing bias variable circuit 93. Likewise, as soon as the image portion output voltage C is taken in, if necessary, the toner feed motor M is controlled by the toner feed circuit 91. When the first sheet has been copied, the light source 2 is turned off, and in order to scan the second sheet it is turned on again to begin scanning. Then, in the same way as the first sheet, the non-image portion density B and the image portion density C are taken in. After completing the second sheet, each device is turned off at a predetermined timing.

Figure 7:
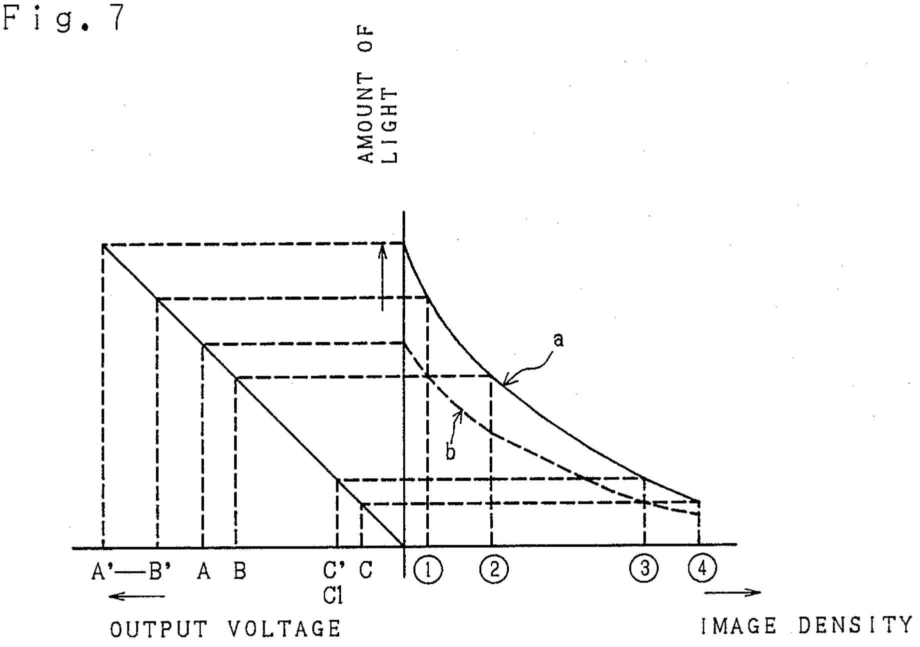
FIG. 7 is a graph showing relationships among an output voltage, reflected light quantity and image density of a density sensor when the non-image portion and image portion are normal.
Figure 8:
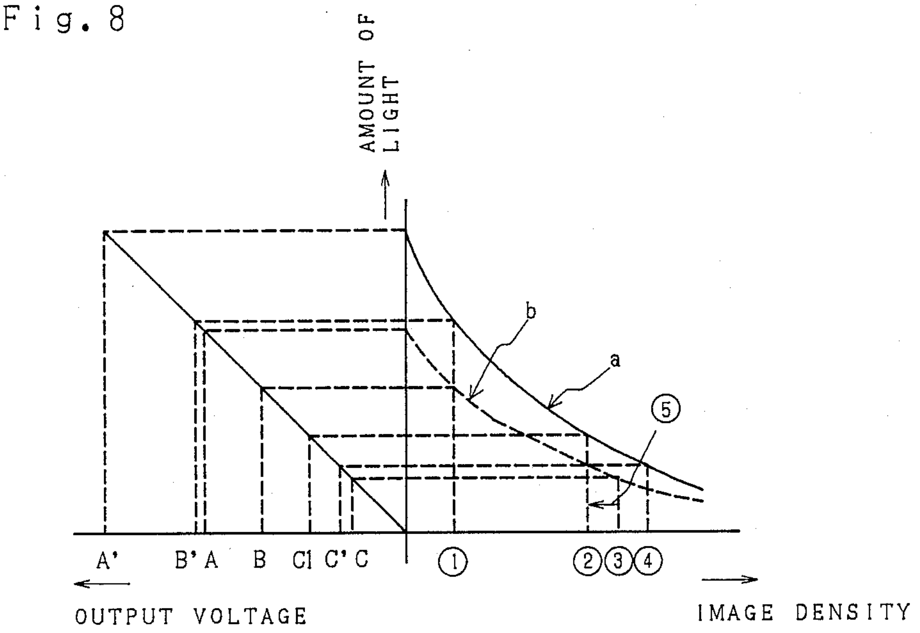
FIG. 8 is a graph showing relationships among an output voltage, reflected light quantity and image density of a density sensor when the non-image portion has a back ground fog and the image portion has a low density.
Figure 9:
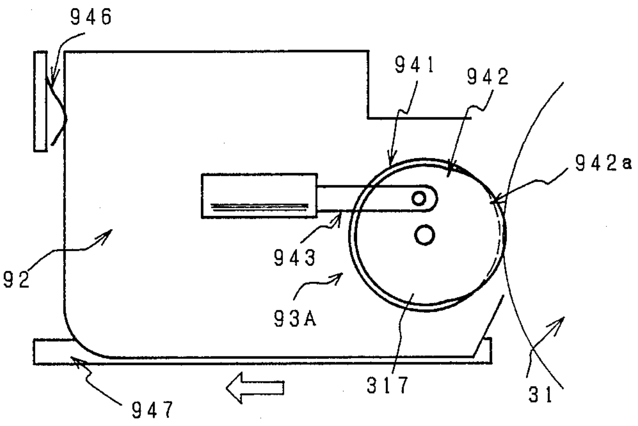
FIG. 9 is a schematic side view showing the construction of the second embodiment.

The correction of density will now be described in detail. FIGS. 7 and 8 are graphs showing relationships among the output voltage, detected amount of light and image density of the density sensor 6, wherein the detected amount of light is plotted along the ordinate and the image density along the abscissa on the right side and the output voltage on the left side thereof. FIG. 8 shows the case where both the image portion and non-image portion are normal, while FIG. 9 shows the case where the non-image portion has a "background fog" and the image portion has a lower density. A curve a designates the case where the density sensor 6 is clean, and a curve b designates the case where it is not.

When each output voltage A, B and C is taken in at the timing mentioned hereinbefore, it is subjected to the D/A conversion at the predetermined timing. The non-developing portion output voltage A after D/A conversion is inputted to one end of the first amplifier 83, and to the other end thereof, D/A converted value of the non-developing reference value A' is inputted. The first amplifier 83, as previously described, outputs the sensor correcting value A'' (A''=A'/A) which is obtained by dividing the non-developing portion reference value A' with the non-developing portion output voltage A, thereby correcting the stained density sensor 6 accurately. The D/A converted non-image portion output voltage B is inputted to the second amplifier 84, and the non-image portion correcting output value B' ($B'=A''\times B$) obtained by multiplying the sensor correcting value A'' and the non-image portion output voltage B to correct the stained density sensor 6 is outputted. The non-image portion correcting output value B' is inputted to one end of the fourth amplifier 86, and to the other end thereof, the non-developing portion reference value A' is inputted, and the non-image portion control value 8A which is a difference between the non-developing portion reference value A' and the non-image portion correcting value B' is outputted. FIG. 7 (1) shows the non-image portion density after correcting the stained sensor, and FIG. 7 (2) shows that detected before correcting the same. Likewise, FIG. 8 (1) shows the fogged non-image portion density after correcting the stained sensor.

The image portion output voltage C after D/A conversion is inputted to the third amplifier 85 and corrected through the calculation of the following equation (1), by means of the sensor correcting value A" and the non-image portion control value 8A to output the image portion correcting value C.

$$C1=C\times A''-K\times(8A-l) \quad (1)$$

Where,

K: variation of the non-image portion control value 8A, and inclination of variation of the image portion density when the developing bias is varied according to the variation of the non-image portion control value 8A (first order regression), l: the non-image portion control value 8A in the state (initial state) with no background fog.

Meanwhile, since 8A=l in FIG. 7 because the non-image portion density is the same as the initial value, it gives the following equation, $$C1=C\times A'' \quad (2)$$

FIG. 7 (3) shows the reference image portion density and FIG. 7 (4) shows the image portion density detected when not corrected. FIG. 8 (2) shows the estimated image portion density after the increment of developing bias, FIG. 8 (3) shows the image portion density detected at a lower density, FIG. 8 (4) shows the reference image portion density as same as shown in FIG. 7 (3), and FIG. 8 (5) shows the image density which is lowered by the increment of developing bias. As shown in FIG. 8 (5), since the image portion density varies when changing the developing bias, it is used as a feedback signal of the non-image portion control value 8A besides correcting the sensor stain to estimate the image portion density after changing the developing bias and correct the image portion density.

The non-image portion control value 8A and image portion control value 8B corrected and outputted as described hereinbefore, are inputted to the developing bias variable circuit 93 and toner feed circuit 91, in the former, the developing bias is changed so as to bring the non-image portion control value 8A close to its initial value l, and in the latter, the toner feed is adjusted so as to bring the image portion control value 8B close to zero. That is, when a signal increasing the toner feed is outputted to the toner feed motor M from the toner feed circuit 91 when feeding the fixed amount corresponding to the consumption, the opening 921*a* of the toner bottle 921 is opened for a fixed time to increase the toner feed.

FIG. 9 is a schematic side view partly showing the construction of the second embodiment of the present invention. In the second embodiment, a non-developing portion forming means 93A is formed by spacing the sleeve roller 317 from the photosensitive member 31. In the embodiment, at opposite ends of the sleeve roller 317, elliptic cams 942 are disposed, and on the inner side of the cam 942, a roller 941 for restricting the space between the sleeve roller 317 and the photosensitive member 31 is disposed, and on one side of the elliptic con 942, a movable portion 943 of an actuator such as an electromagnetic clutch is mounted with its fixed-portion being secured to the housing 1. Through the telescopic motion of the movable portion 943, the elliptic cam 942 is rotatable around the center axis of the sleeve roller 317. Likewise, the developing means 92 having the sleeve roller 317 is totally movable horizontally and its guide rail 947 is fixed to the housing 1. In addition, for approaching the entire developing means 92 to the photosensitive member 31, a spring 946 is provided on the housing 1.

In the non-developing portion forming means 93A of the second embodiment constructed in such a manner, its operation is as follows. Normally, a distance between the sleeve roller 317 and the photosensitive member 31 is restricted by contacting the roller 941 to the latter, and the toner T conveyed through the sleeve roller 317 is stuck to the unexposed portion of the photosensitive member 31 to form on image thereon. When the electromagnetic clutch is turned on to form the non-developing portion 310 on the surface of the photosensitive member 31, the movable portion is extended to rotate the elliptic cam 942, permitting the tip 942*a* of the cam to contact with the photosensitive member 31, thereby the entire developing means 92 is moved toward the direction of the white arrow on the guide rail 947 as the guide, and the sleeve roller 317 is detached from the photosensitive member 31 to which the toner T is made untouchable.

Figure 10:
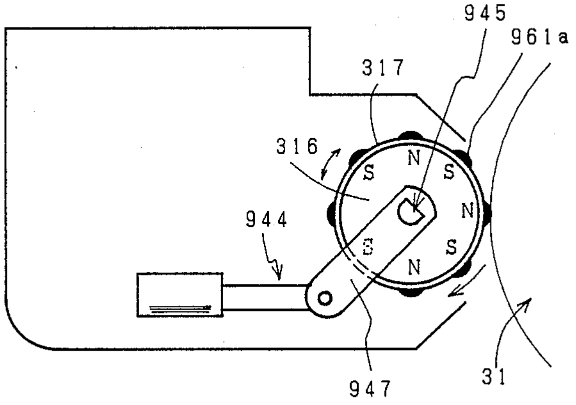
FIG. 10 is a schematic side view showing the construction of the third embodiment.

FIG. 10 is a schematic side view showing the third embodiment, wherein the non-developing portion is formed by forming a developer brush tip 961*a* formed on the sleeve roller 317 in the position not touching the photosensitive member 31, a lever 947 is fixed to the center axis 945 of the magnetic roller 316 and on one end of the lever 947, the movable portion 944 of the actuator such as the electromagnetic clutch is rotatably mounted. Through the telescopic motion of the movable portion 944, the magnetic roller 316 is rotated through the lever 947 to rotate the developer brush tip 961*a* formed on the sleeve roller 317 at the position corresponding to the main pole so that the developer brush tip 961*a* does not touch the photosensitive member 31. The developer brush tip 961*a* is thus formed at the position not touching the photosensitive member 31 so as to keep the toner T apart therefrom.

Figure 11:
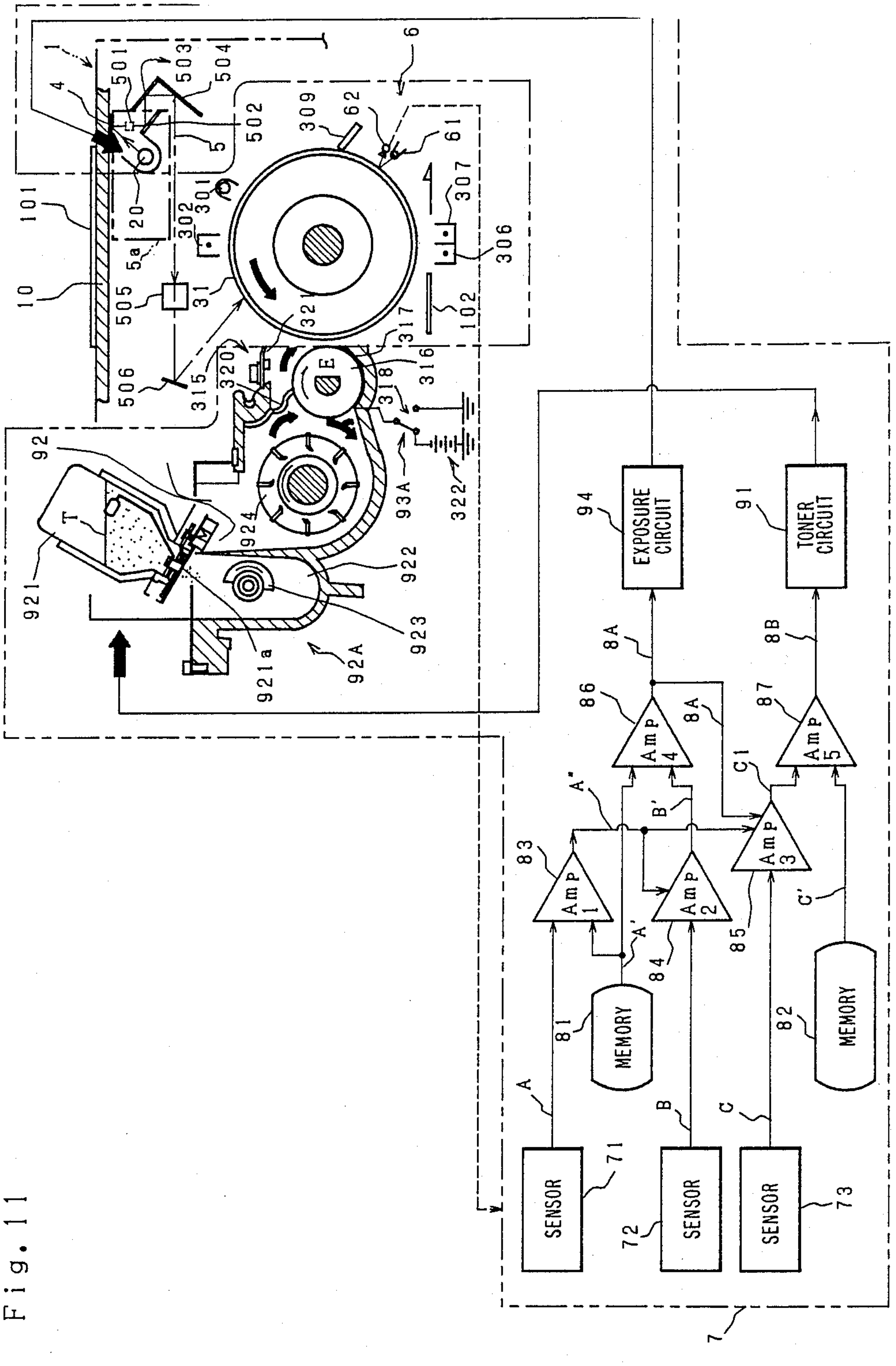
FIG. 11 is a block diagram showing the construction of the fourth embodiment.

FIG. 11 is a block diagram showing the construction of the fourth embodiment, wherein the non-image portional density control is performed not by controlling the developing bias power source but by varying exposure amount of light source 20. Thus, the outlet line from the fourth amplifier 86 is connected to the exposure amount of light variable circuit 94 whose outlet line is connected to the light source 20.

When the non-image portion control value 8A is increased, the exposure amount of light is increased to control the non-image portion control value 8A to approach to its initial value l.

Figure 12:
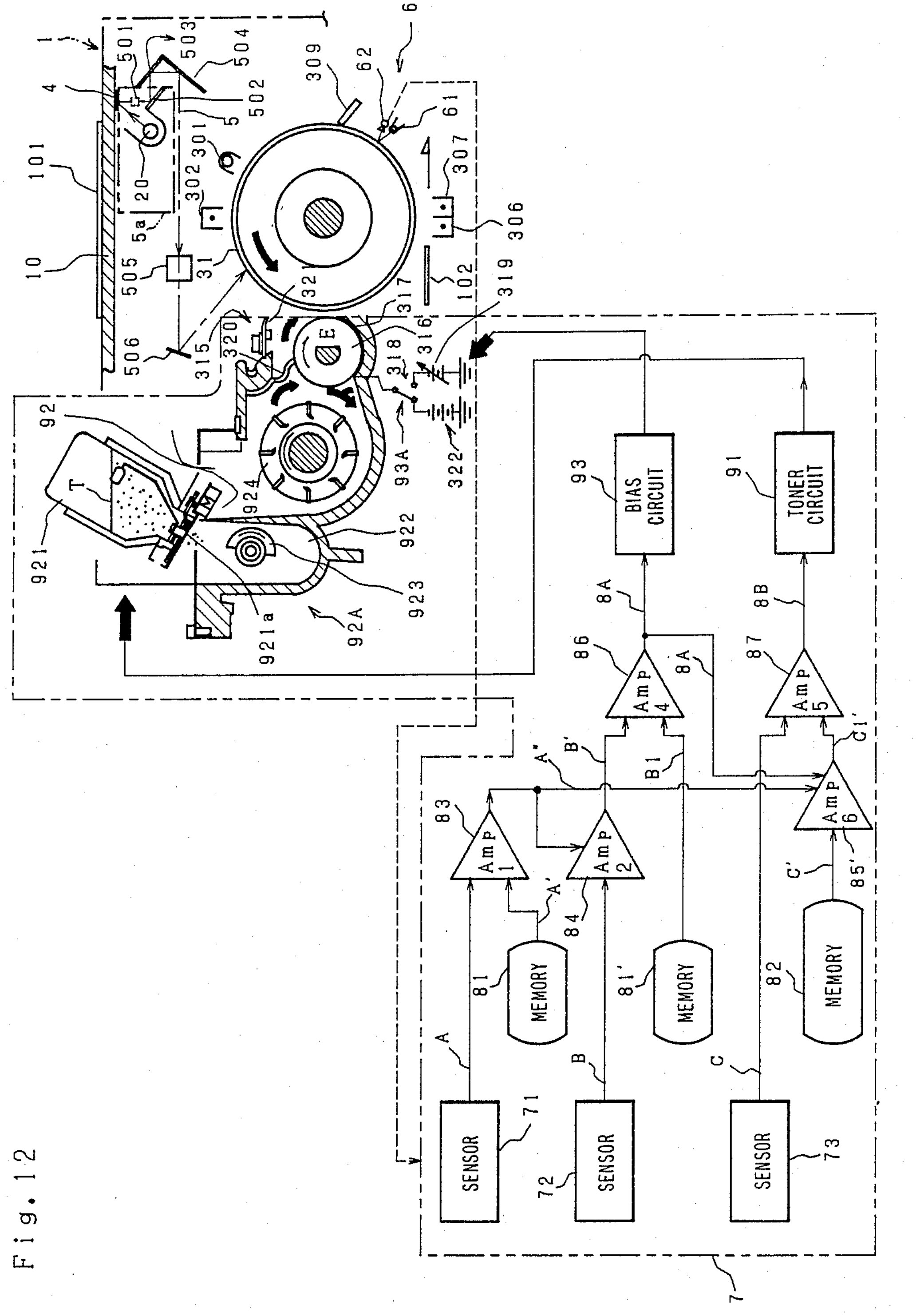
FIG. 12 is a block diagram showing the construction of the fifth embodiment.

FIG. 12 is a block diagram showing the construction of the fifth embodiment, wherein a non-image portion reference value memory 81' is provided to store the non-image portion reference value B1. Likewise, the image portion reference value C' is corrected instead of correcting the image portion output voltage C.

The outlet line from the non-developing portion density sensor 71 is connected to one end of the first amplifier 83, and to the other end thereof, the outlet line of the non-developing portion reference value memory 81 is connected. The outlet line from the first amplifier 83 is connected to the second amplifier 84 and a sixth amplifier 85'. Also, the outlet line from the non-image portion density sensor 72 is connected to the second amplifier whose outlet line is connected to one end of the fourth amplifier, and to the other end thereof, the outlet line from the non-image portion reference value memory 81' is connected. The outlet line from the image portion or half-tone portion density sensor 73 is connected to one end of the fifth amplifier 87, and to the other end thereof, the outlet line of the image portion reference value memory 82 is connected through the sixth amplifier 85'. The outlet line from the fourth amplifier 86 is connected to the sixth amplifier 85' and the developing bias variable circuit 93, and the outlet line from the fifth amplifier 87 is connected to the toner feed circuit 91.

In the automatic image density control apparatus of the fifth embodiment thus constructed, its operation will be described as follows.

The non-developing portion output voltage A outputted from the non-developing portion density sensor 71 is calculated in the first amplifier in the same way as the first embodiment, and outputs the sensor correcting value A'' (A=A'/A) from the first amplifier 83. The non-image portion output voltage B outputted from the non-image portion density sensor 72 is corrected in the second amplifier in the same way as the first embodiment, and outputs the non-image portion correcting value B' ($B'=B\times A''$) which is compared with the non-image portion reference value B1 in the fourth amplifier 86, and the non-image portion control value 8A ($8A=B'-B1$) is outputted as the difference. Meanwhile, the non-image portion reference value B1 is, in the same way as the image portion reference value C' in the first embodiment, the output voltage of the non-image portion **41*a* of the photosensitive member 31 stored while the density sensor 6** is in the clean state.

The image portion output voltage C outputted from the image portion or half-tone portion density sensor 73 is inputted to one end of the fifth amplifier 87. Likewise, the image portion reference value C' outputted from the image portion reference value memory is inputted to the sixth amplifier 85' and corrected, through calculations of the following equations (3) and (4), to be the image portion correction reference valve C1', and inputted to the other end of the fifth amplifier 87.

When $8A-l\geq 0$, $$C1'=\{C'+K\times(8A-l)\}\times 1/A'' \quad (3)$$

When $8A-l<0$, $$C1'=C'\times l/A'' \quad (4)$$

Then, in the fifth amplifier 87, the image portion output voltage C and the image portion correction reference value C1' are compared to output the image portion control value 8B as its difference.

It is to be understood that, in the above five embodiments, though the reference pattern 4 is used to form the reference latent image, it is also possible to obtain the image portion pattern by interrupting the light path by means of a shutter or the like, and that the present invention may be applied in a so-called negative-positive development such as an electrophotographic printer and the like.

As particularly described heretofore, in the automatic image density control apparatus of the present invention, the non-developing portion to which the toner is not stuck is formed on the surface of the photosensitive member, the non-image portion output voltage and the image portion output voltage are corrected respectively with the ratio of the non-developing reference value, which is its initial value, and the non-developing output voltage changed from the non-developing reference value as the time elapses due to the stained density sensor and the change of the surface of the photosensitive member, and since the image portion output voltage is corrected further with the non-image portion control value, the image portion density and the non-image portion density can be corrected simultaneously, and the image density can be controlled accurately without being influenced by the non-image portion fog.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An automatic image density control apparatus comprising;
   - a photosensitive member,
   - a charging means for charging a surface of said photosensitive member at a predetermined potential,
   - an exposing means for partly erasing the charge on the surface of said photosensitive member to form a reference latent image on the surface of said photosensitive member charged by said charging means,
   - a developing means for contacting a developer to the surface of said photosensitive member to develop said reference latent image,
   - a non-developing portion forming means for forming the non-developing portion on the surface of said photosensitive member to which the developer is not stuck,
   - a first density detecting means for detecting and outputting the density of said non-developing portion,
   - an image information generating means for outputting a value associated with an output value obtained by said first density detecting means and a preset non-developing portion reference value,
   - a second density detecting means for detecting and outputting the image density of a reference real image developed from the reference latent image,
   - a correcting means for correcting the outputted value obtained by said second density detecting means according to the outputted value from said image information generating means, and
   - a density control means for comparing the outputted value from said correcting means with the preset reference value to control the image density according to its compared result.

2. An automatic image density control apparatus as claimed in claim 1, wherein said developing means includes a sleeve roller containing a magnetic roller.

3. An automatic image density control apparatus as claimed in claim 2, wherein said non-developing portion forming means applies a predetermined bias voltage to said sleeve roller to form the non-developing portion.

4. An automatic image density control apparatus as claimed in claim 2, wherein said non-developing portion forming means rotates said magnetic roller by a predetermined angle to form the non-developing portion.

5. An automatic image density control apparatus as claimed in claim 1, wherein said non-developing portion forming means separates said developing means from said photosensitive member to form the non-developing portion.

6. An automatic image density control apparatus as claimed in claim 1, wherein said density control means includes means for making the bias voltage to be applied to said developing means variable to control a non-image portion density of an image.

7. An automatic image density control apparatus as claimed in claim 1, wherein said density control means includes means for varying an amount of light of said exposing means to control the non-image portion density of an image.

8. An automatic image density control apparatus as claimed in claim 1, wherein said density control means includes means for varying the supply of toner to control the image portion density of an image.

9. An automatic image density control apparatus as claimed in claim 1, wherein said density control means includes means for controlling the image portion density and the non-image portion density of an image.

10. An automatic image density control apparatus comprising;

a photosensitive member, a charging means for charging a surface of said photosensitive member at a predetermined potential, an exposing means for scanning an original placed on a document table and a reference image pattern provided at one edge of said document table and including the black or halftone portion and the white portion, to form an original latent image of said original and a reference latent image of said reference image pattern on the surface of said photosensitive member, a developing means for contacting a developer to the surface of said photosensitive member to develop said original latent image and said reference latent image, a non-developing portion forming means for forming the non-developing portion on the surface of the photosensitive member to which the developer is not stuck, a non-developing portion density detecting means for detecting and outputting the image density of said non-developing portion, a density detecting means for detecting and outputting the density of the image portion and the non-image portion of a reference real image developed from said reference latent image, a ratio computing means for computing and outputting a ratio of the output value obtained by said non-developing portion density detecting means to a preset non-developing portion reference value, a density correcting means for respectively correcting the output value of the image portion and the non-image portion obtained by said density detecting means according to said ratio, and a density control means for comparing the output value of the image portion from said density correcting means with the preset image portion density reference value to control the image portion density, and comparing the output value of the non-image portion from said density correcting means with said non-developing portion reference value to control the non-image portion density.

11. An automatic image density control apparatus as claimed in claim 10, wherein said developing means includes a sleeve roller containing a magnetic roller.

12. An automatic image density control apparatus as claimed in claim 11, wherein said non-developing portion forming means applies a predetermined bias voltage to said sleeve roller to form the non-developing portion.

13. An automatic image density control apparatus as claimed in claim 11, wherein said non-developing portion forming means rotates said magnetic roller by a predetermined angle to form the non-developing portion.

14. An automatic image density control apparatus as claimed in claim 10, wherein said non-developing portion forming means separates said developing means from said photosensitive member to form the non-developing portion.

15. An automatic image density control apparatus as claimed in claim 10, wherein said density control means includes means for making the bias voltage to be applied to said developing means variable to control the non-image portion density of an image.

16. An automatic image density control apparatus as claimed in claim 10, wherein said density control means includes means for varying an amount of light of said exposing means to control the non-image portion density of an image.

17. An automatic image density control apparatus as claimed in claim 10, wherein said density control means includes means for varying the supply of said developer to control the image portion density of an image.

18. An automatic image density control apparatus comprising;

a photosensitive member, a charging means for charging a surface said photosensitive member at a predetermined potential, an exposing means for scanning an original placed on a document table, and a reference image pattern provided at one edge of said document table and including a black or half-tone portion, to form an original latent image of said original and a reference latent image of said reference image pattern on the surface of said photosensitive member, a developing means for contacting a developer to the surface of said photosensitive member to develop said original latent image and said reference latent image, a non-developing portion forming means for forming the non-developing portion on the surface of the photosensitive member to which the developer is not stuck, a non-developing portion density detecting means for detecting and outputting the image density of said non-developing portion, a density detecting means for detecting and outputting the density of the image portion of a reference real image developed from said reference latent image, a ratio computing means for computing and outputting a ratio of an output value obtained by said non-developing portion density detecting means with a preset non-developing portion reference value, a density correcting means for correcting the output value of the image portion obtained by said density detecting means according to said ratio, and a density control means for comparing the output value of the image portion from said density correcting means with the preset image portion density reference value to control the image portion density.

19. An automatic image density control apparatus as claimed in claim 18, wherein said developing means includes a sleeve roller containing a magnetic roller.

20. An automatic image density control apparatus as claimed in claim 19, wherein said non-developing portion forming means applies a predetermined bias voltage to said sleeve roller to form the non-developing portion.

21. An automatic image density control apparatus as claimed in claim 19, wherein said non-developing portion forming means rotates said magnetic roller by a predetermined angle to form the non-developing portion.

22. An automatic image density control apparatus as claimed in claim 18, wherein said non-developing portion forming means separates said developing means from said photosensitive member to form the non-developing portion.

23. An automatic image density control apparatus as claimed in claim 18, wherein said density control means includes means for varying the supply of toner to control the image portion density of an image.

24. An automatic image density control apparatus comprising;

a photosensitive member, a charging means for charging a surface of said photosensitive means at a predetermined potential, an exposing means for scanning an original placed on a document table and a reference image pattern provided at one edge of said document table and including the white portion, to form an original latent image of said original and a reference latent image of said reference image pattern, a developing means for contacting a developer to the surface of said photosensitive member to develop said original latent image and said reference latent image, a non-developing portion forming means for forming the non-developing portion on the surface of the photosensitive member to which the developer is not stuck, a non-developing portion density detecting means for detecting and outputting the image density of said non-developing portion, a density detecting means for detecting and outputting the non-image portion density of a reference real image developed from said reference latent image, a ratio computing means for computing and outputting a ratio of an output value obtained by said non-developing portion density detecting means with a preset non-developing portion reference value, a density correcting means for correcting the non-image portion output value obtained by said density detecting means according to said ratio, and a density control means for comparing the non-image portion output value from said density correcting means with said non-developing portion reference value to control the non-image portion density.

25. An automatic image density control apparatus as claimed in claim 24, wherein said developing means includes a sleeve roller containing a magnetic roller.

26. An automatic image density control apparatus as claimed in claim 25, wherein said non-developing portion forming means applies a predetermined bias voltage to said sleeve roller to form the non-developing portion.

27. An automatic image density control apparatus as claimed in claim 25, wherein said non-developing portion forming means rotates said magnetic roller by a predetermined angle to form the non-developing portion.

28. An automatic image density control apparatus as claimed in claim 24, wherein said non-developing portion forming means separates said developing means from said photosensitive member to form the non-developing portion.

29. An automatic image density control apparatus as claimed in claim 24, wherein said density control means includes means for making the bias voltage applied to said developing means variable to control the non-image portion density of an image.

30. An automatic image density control apparatus as claimed in claim 24, wherein said density control means includes means for varying an amount of light of said exposing means to control the non-image portion density of an image.

31. An automatic image density control apparatus comprising;

a photosensitive member, a charging means for charging a surface of said photosensitive member at a predetermined potential, an exposing means for partly erasing the charge on the surface of said photosensitive member to form a reference latent image on the surface of said photosensitive member charged with said charging means, a developing means for contacting a developer to the surface of said photosensitive member to develop said reference latent image, a non-developing portion forming means for forming the non-developing portion on surface of said photosensitive member to which the developer is not stuck, a first density detecting means for detecting and outputting the image density of the non-developing portion, an image information generating means for outputting a value associated with an output value obtained by said first density detecting means and a preset non-developing portion reference value, a second density detecting means for detecting and outputting the image density of a reference real image developed from the reference latent image, a density control means for comparing the output value from said second density detecting means with the preset image reference value to control the image density according to its compared result, and a correcting means for correcting said image reference value according to the output value from said image information generating means.

32. An automatic image density control apparatus as claimed in claim 31, wherein said developing means includes a sleeve roller containing a magnetic roller.

33. An automatic image density control apparatus as claimed in claim 32, wherein said non-developing portion forming means applies a predetermined bias voltage to said sleeve roller to form the non-developing portion.

34. An automatic image density control apparatus as claimed in claim 32, wherein said non-developing portion forming means rotates said magnetic roller by a predetermined angle to form the non-developing portion.

35. An automatic image density control apparatus as claimed in claim 31, wherein said non-developing portion forming means separates said developing means from said photosensitive member to form the non-developing portion.

36. An automatic image density control apparatus as claimed in claim 31, wherein said density control means includes means for making the bias voltage to be applied to said developing means variable to control the density of an image.

37. An automatic image density control apparatus as claimed in claim 31, wherein said density control means includes means for varying an amount of light of said exposing means to control the non-image portion density of an image.

38. An automatic image density control apparatus as claimed in claim 31, wherein said density control means includes means for varying the supply of toner to control the image portion density of an image.

39. An automatic image density control apparatus as claimed in claim 31, wherein said density control means includes means for controlling the image portion density and the non-image portion density of an image.

* * * * *